G. W. BULLEY.
TIRE VULCANIZING MECHANISM.
APPLICATION FILED FEB. 18, 1918.
1,359,487. Patented Nov. 23, 1920.
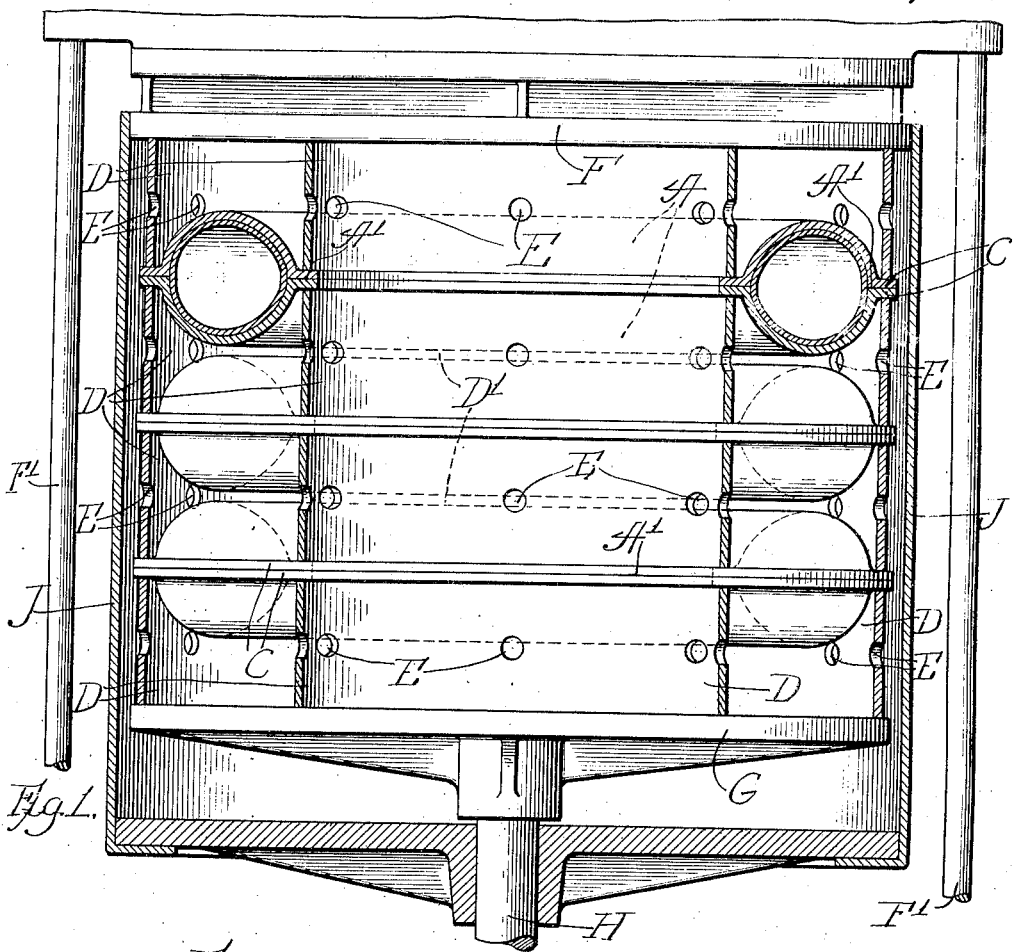
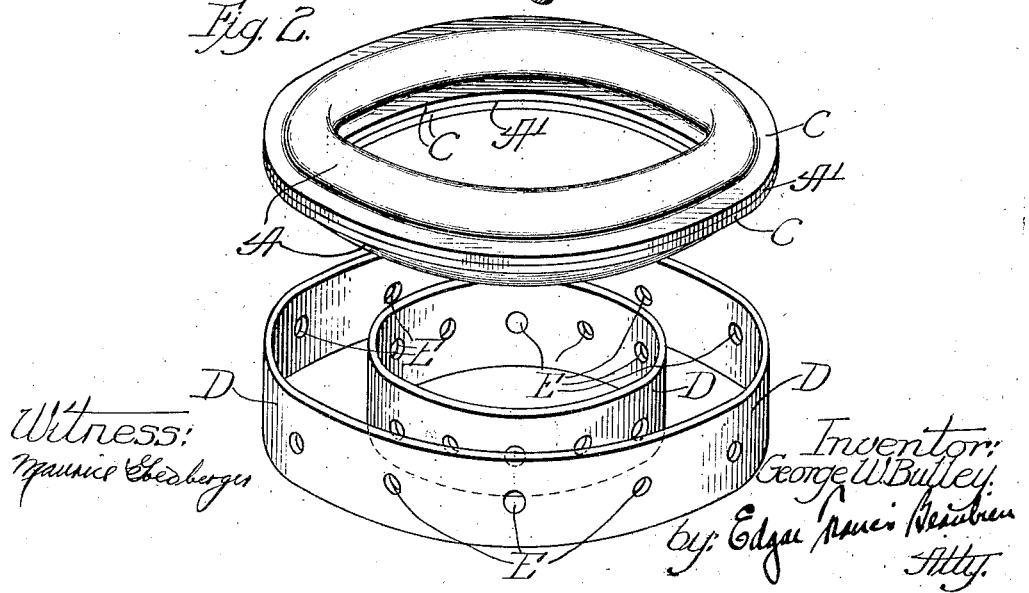

UNITED STATES PATENT OFFICE.

GEORGE W. BULLEY, OF ST. JOSEPH, MICHIGAN.

TIRE-VULCANIZING MECHANISM.

1,359,487.  Specification of Letters Patent.  Patented Nov. 23, 1920.

Application filed February 18, 1918. Serial No. 217,766.

*To all whom it may concern:*

Be it known that I, GEORGE W. BULLEY, a citizen of the United States of America, and resident of St. Joseph, Berrien county, Michigan, have invented a certain new and useful Improvement in Tire-Vulcanizing Mechanism, of which the following is a specification.

My invention relates to improvements in vulcanizing mechanism for vehicle tires, and my object is to provide an improved structure for this purpose which is simple, durable and reliable in construction, and effective and efficient in operation.

Other objects of my invention will appear hereinafter.

My invention consists in the features of novelty exemplified by the construction, combination and arrangement of parts hereinafter described, shown in the accompanying drawings, and more particularly set forth in the appended claims.

Referring to the accompanying drawings,—

Figure 1 is a vertical sectional view of a vulcanizing press and a series of molds and spacers stacked therein illustrative of a structure embodying my invention.

Fig. 2 is a perspective view of one of the molds and spacers.

The mold structure which I have shown in the drawings is adapted for the curing or vulcanizing of automobile or other vehicle tires, and this particular mold is designed for use in vulcanizing inner tubes of vehicle tires, although it will be understood that the invention is equally as applicable to the vulcanizing of outer tires or casings. This mold structure involves two like sections or divisions A which, when fitted together, form a complete inclosure for the tube or tire to be cured. These mold sections are made of suitable material such as steel, and are circular in form to correspond to the annular contour of the usual automobile tire. The mold is preferably composed of two sections rather than three or a larger number thereof, because two sections are sufficient to enable the tube to be readily inserted in place and removed with the minimum number of parts to handle. When the two sections are together, the mold is substantially circular in section, but, of course, the cross-sectional configuration depends upon that of the tire or tube to be treated. The mold here shown and described is of the single-walled type which, in conjunction with a number of like molds, is adapted to be placed within a suitable chamber or inclosure, where they are subjected to the application of heat, the heat being usually supplied through the medium of live steam. Owing to the fact that in the process of vulcanizing tires, the heat is conveyed to the tire itself through the walls of the molds, I have discovered that the success of the process is assured by forming the walls of the mold of substantially uniform thickness and density throughout. Furthermore, I make this uniform wall a great deal thinner than has been the common practice heretofore. The result is that the temperature can be more accurately and uniformly regulated, and the mold is more quickly responsive. In practice, the heat is conducted to the tire uniformly throughout the entire mold and a great deal less time is required to bring the mold to the proper temperature. On the other hand, the mold cools quickly when treatment of the tire is stopped. This is an extreme advantage from the standpoint of the quality of the product because, since the cooling of the mold is almost co-incident with the termination of the vulcanizing process, there is no danger of over-vulcanization from the heat of the mold. Aside from the improved uniformity and quality of the tire product, the mold offers other advantages. The rapid cooling enables the mold to be used oftener in a given period of time, and the output is considerably increased. Furthermore, the mold, in practice, is so light in weight that it can be handled by the men without the use of hoists or lifting machinery. Also, the reduction in size makes possible the use of a greater number of molds in a given space. The two sections of the mold are identical. The dividing line between the sections is located in a central plane intersecting the circumference, this line being formed by the abutting edges A¹. These abutting edges are preferably accurately machined so as to form a tight close-fitting joint.

Each section of the mold is provided with a comparatively small flange or rim C, which is preferably continuous around the section. In this particular structure, I have shown a flange or rim C for each section and for both the inner and outer peripheries thereof. These flanges or rims are preferably located adjacent the plane of separation or dividing line of the sections, and are substantially flush or coincident with the edges $A^1$. When the sections are thus assembled, the corresponding flanges are brought close together to form in effect single continuous rims around the outer and inner peripheries of the mold. These flanges form a means by which the sections are clamped, and for this reason a slight clearance is left therebetween so as to insure a slight, close fit between the wall edges $A^1$. When these molds are to be clamped closed by the pressure of the usual hydraulic press, they will not stack properly on the press-platen. Furthermore, on account of their comparatively thin walls the necessary pressure for clamping them might tend to distort them if they were stacked directly upon one another. For these reasons, I provide annular clamping and spacer members D between the adjacent molds in the stacks. In the present structure, these clamping and spacer members are in the form of circular rings of flat bands of metal. They are positioned between adjacent molds with their axes in vertical alinement with the axes of the molds. They are of slightly larger diameter than the body of the molds so that their edges will abut the flanges or rings of the molds and the bodies of the molds will be positioned within the spacers. While I have shown two members D between each two molds and in connection with the outer and inner mold flanges, it is obvious that if desired a single member of same height may be used between each two molds. This single member may be positioned between the flanges on the inner or outer peripheries of the mold, as desired, the diameter of the member being arranged accordingly. The bands of metal from which these clamping and spacer members are made are preferably of just sufficient width so that they will hold off one mold a slight distance $D^1$ from its neighbor, thereby preventing any of the clamping pressure coming on the bodies of the molds. Since these spacers are set on edges, they are capable of withstanding enormous pressures without distortion, hence they act as compression or clamping members for the molds. It will be observed that with these clamping and spacing members a very stable stack may be placed in the press or elsewhere in fact without danger of the molds and clamps becoming displaced laterally with respect to each other. This is obvious because the mold bodies just fit within the members D. Since the heat is transferred to the molds by direct contact of the steam therewith, I provide each of the spacer-members with a number of perforations or openings E so as to permit free circulation of the steam throughout the entire area of the mold surfaces. In the drawings, I have shown a conventional hydraulic press for clamping the molds. This may be the usual or any approved type for the purpose. The press shown consists of an upper stationary head or platen F supported by suitable columns $F^1$, and a lower platen G supported upon a piston rod H of the hydraulic mechanism. The lower platen is movable vertically so as to clamp a stack of molds between itself and the upper head. A suitable casing or inclosure J surrounds the stack of molds and provides a heating chamber to which steam may be admitted by any suitable means. In this type of press, the heating chamber is carried by a lower head which is movable on the press piston so that it may be raised and lowered to permit the molds and spacers being inserted and removed.

What I claim as my invention is:

1. The combination of a suitable clamping press having opposed clamping members, a plurality of vulcanizing molds having peripheral flanges, annular clamping and spacing members between and engaging the flanges of adjacent molds, and a heating inclosure for the molds.

2. The combination of a plurality of tire molds superposed one above the other and comprising separable sections, peripheral projections on said sections, a clamping member positioned between and engaging the projections of each two adjacent molds, and means for applying clamping pressure to said clamping members.

3. The combination of a plurality of annular vulcanizing molds arranged in stack relation and each comprising separable sections, peripheral projections on the sections of said molds, clamping members between the molds engaging the projections of the sections of adjacent molds, and arranged to space the molds from each other, and means for applying clamping pressure to said clamping members while the molds are in said stacked relation.

4. The combination of a plurality of tire vulcanizing molds divided into separable sections and arranged in stacked relation, flanges on the sections adjacent the division lines, a spacing ring positioned between each two adjacent molds and of sufficient width to hold the molds apart, said spacing rings being in engagement with said flanges, and means for compressing the spacing rings to clamp the mold sections together.

5. The combination of an annular tire vulcanizing mold body composed of two separable sections, an annular flange on each section, an annular clamping member on each side of said mold abutting the flange of the mold section on the corresponding side thereof, and means for applying pressure to said members to clamp the mold sections together.

6. The combination of an annular tire vulcanizing mold body composed of two separable sections, an annular flange on each section, an annular clamping member on each side of said mold abutting the flange of the mold section on the corresponding side thereof, and having openings therein to permit the circulation of heating medium in contact with the mold, and means for applying pressure to said members to clamp the mold sections together.

Signed by me at Chicago, Illinois, this 21 day of January, 1918.

GEORGE W. BULLEY.